United States Patent [19]

Kohn et al.

[11] Patent Number: 4,638,045

[45] Date of Patent: Jan. 20, 1987

[54] NON-PEPTIDE POLYAMINO ACID BIOERODIBLE POLYMERS

[75] Inventors: Joachim Kohn, Brookline; Robert S. Langer, Somerville, both of Mass.

[73] Assignee: Massachusetts Institute of Technology, Cambridge, Mass.

[21] Appl. No.: 703,153

[22] Filed: Feb. 19, 1985

[51] Int. Cl.$^4$ ............................................. C07K 1/06
[52] U.S. Cl. ..................................... 530/323; 530/335; 530/337; 528/328; 424/19; 424/26; 424/36; 424/78; 604/891; 604/892
[58] Field of Search ................. 260/112.5 R; 528/328; 530/323, 335, 337

[56] References Cited

U.S. PATENT DOCUMENTS 3,773,737 11/1973 Goodman et al. ................... 528/328
4,385,189 5/1983 Kato et al. ........................... 528/328
4,511,478 4/1985 Nowinski et al. ................ 260/112.5

*Primary Examiner*—Morton Foelak
*Assistant Examiner*—Garnette D. Draper
*Attorney, Agent, or Firm*—Paul J. Cook

[57] ABSTRACT

A novel bioerodible polymeric composition is provided comprising a plurality of monomer units of two or three amino acids which are polymerized via hydrolytically labile bonds at their respective side chains rather than at the amino or carboxylic acid terminals by amide bonds. Such polymers are useful for controlled release applications in vivo and in vitro for delivery of a wide variety of biologically and pharmacologically active ligands.

14 Claims, No Drawings

NON-PEPTIDE POLYAMINO ACID BIOERODIBLE POLYMERS

FIELD OF THE INVENTION

The present invention is directed to compositions for the controlled release of active ligands and agents and is specifically concerned with bioerodible polymers which are useful in medical applications including the in vivo delivery of active drugs and other therapeutic agents into the body, for sutures, or for implantable devices including artificial limbs or the like.

BACKGROUND OF THE INVENTION

The concept of using polymers for the controlled release of active drugs and other therapeutic ligands for medical applications has emerged and developed only in the last fifteen to twenty years. Conventionally, active drugs and other agents are administered by periodic application by ingestion of pills, liquids and the like or by injection of the active agent which is then distributed throughout much of the body rather than directed to a specific target area. The difficulties of the conventionally known methods of administration typically arise immediately following the application in which the concentration of the active agent rises to high levels and is distributed system-wide throughout all parts of the body. In some cases, these initially high concentrations produce undesired side effects either at the targeted area requiring the medication or the environments surrounding the targeted area. As time passes after its immediate introduction, the concentration of the active agent begins to fall because of the natural processes of the body which eliminate it from the system, consume it, or degrade it. It has often been found that before the next application of the therapeutic drug is given, the concentration of the active agent has fallen below the necessary level for therapeutic response. In this manner, even periodic applications of the active agent are complicated by concentrations of the active agent which are alternatively either too high or too low within the same dosage period. In addition, such a cyclic regime is rather inefficient in that only a fraction of the entire concentration of active agent introduced into the body reaches the targeted area and performs the intended function.

For these reasons, alternative methods of introducing and controlling the release of active agents have been sought. Much active effort has thus focused on the use of polymeric formulations for the controlled release of active agents using a variety of methods, compositions, and areas of application [*Controlled Release Polymeric Formulations*, D. R. Paul and F. W. Harris editors, American Chemical Society, Washington, DC 1976]. It has been noted that the function and selection of the polymeric composition suitable for use in a controlled release application should include the following: diffusion and solubility characteristics with the active agents which provide the desired release control; compatibility with the use environment in that the polymer is neither toxic nor antagonistic in medical applications; and compatability with the active agent in that there are no undesirable reactions or physical interactions with the agent.

One of the major problems associated with controlled release polymers and methods is how to combine the active agent with its polymer carrier in a manner which provides a release profile which provides a constant rate of delivery of the active agent over time; by analogy with chemical kinetics, this has become known as a "zero order" process since such a mechanism would not depend on how much of the agent has been delivered or remains attached to the polymer carrier. Bioerodible carriers or polymers rely on the release of the active agent as the polymer carrier is eroded away by the environment through physical processes such as dissolution or by chemical processes such as hydrolysis of the polymer backbone or crosslinks, or by enzymatic degradation. When such polymers are used for delivery of pharmacologically active agents within medical applications, it is essential that the polymers themselves be nontoxic and that they degrade into non-toxic degradation products as the polymer is eroded by the body fluids. However, many synthetic, biodegradable polymers upon erosion in vivo yield oligomers and monomers which often adversely interact with the surrounding tissue [D. F. Williams, *J. Mater. Sci.* 17:1233 (1982)]. In order to minimize the toxicity of the intact polymer carrier and its degradation products, polymers were designed based upon naturally occurring metabolites. Probably the most extensively studied examples of such polymers are the polyesters derived from lactic or glycolic acid [H. Laufman et al., *Surg. Gynecol. Obstet.* 145:597(1977); D. L. Wise et al., in *Drug Carriers In Biology And Medicine* (G. Gregoriadis ed.), Academic Press, London, 1979, pages 237–270] and polyamides derived from amino acids [D. A. Wood, *Int. J. Pharm.* 7:1(1980); S. Yolles et al., in *Controlled Release Technologies: Methods, Theory, And Applications*; A. F. Kydonieus, ed. C.R.C. Press, Boca Raton, Florida, 1980, pages 1–6].

Polyesters based on lactic acid and/or glycolic acid have been shown to be nontoxic and are being used now as bioabsorbable sutures. These polymeric compositions unfortunately erode homogeneously (bulk erosion) which results in uncontrolled and unpredictable release of active agents via unfavorable release kinetics when used for drug release applications. Such "monolithic" systems using these bioerodible polymers share the problem encountered with polyamide polymers which usually show large burst effects and irregular release of active agents when used for control drug delivery. It is now generally accepted that such monolithic bioerodible drug delivery systems demonstrate the desirable "zero-order" release kinetics only if the polymer carrier is hydrophobic enough to erode heterogeneously, that is by surface erosion rather than bulk degradation [J. Heller, in *Medical Applications Of Controlled Release* (R. S. Langer and D. L. Wise, eds.) C.R.C. Press, Boca Raton, Florida, 1985]. Unfortunately, it is difficult to produce hydrophobic polymeric compositions which degrade by surface erosion and provide the desired release kinetics without themselves being allergenic or toxic or degrading into allergenic or toxic degradation products. Such polymers have remained a soughtafter goal.

SUMMARY OF THE INVENTION

The present invention is a class of bioerodible amino acid polymers derived from monomers, comprising two or three amino acid units having the formula:

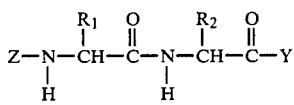

or:

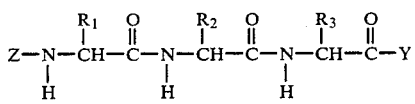

wherein the monomer units are joined via hydrolytically labile bonds at not less than one of the side groups $R_1$, $R_2$ and $R_3$ and where $R_1$, $R_2$, $R_3$, are the side chains of naturally occurring amino acids as described in Table I, and Z is any desirable amine protecting group or hydrogen, and Y is any desirable carboxyl protecting group or hydroxyl. Each monomer unit comprises naturally occurring amino acids which are then polymerized as monomer units via linkages other than by the amide or "peptide" bond. The monomer units may be composed of two or three amino acids united through a peptide bond and thus comprise dipeptides or tripeptides. Regardless of the exact composition of the the monomer unit, all are polymerized by hydrolytically labile bonds via their respective side chains rather than via the amino and carboxyl groups forming the amide bond typical of polypeptide chains. Such polymer compositions are nontoxic, are biodegradable and can provide zero-order release kinetics for the delivery of active agents in a variety of therapeutic applications.

The detailed description of the present invention may be more fully and easily understood when taken in conjunction with the accompanying diagram, in which:

Diagram 1 is a schematic representation of a dipeptide or tripeptide based on L-alpha amino acids as the monomer unit;

Diagram 2 is a schematic representation of dipeptide monomer units which are polymerized using hydrolytic labile bonds to form the present invention;

Diagram 3 is a schematic flow diagram showing the synthetic pathways for the preparation of a specific monomer unit and its subsequent polymerization using iminocarbonate bonds;

Diagram 4 is a schematic representation of a tripeptide having amino and carboxyl protecting groups as part of the monomer unit;

Diagram 5 is a schematic representation of the tripeptide monomer unit and its subsequent polymerization using hydrolytic labile bonds; and Diagram 6 A and B shows specific embodiments of the monomer unit shown in FIG. 5 wherein either the terminal amine or carboxyl group of the unit is unprotected.

DETAILED DESCRIPTION OF THE PREFERRED EMBODIMENTS

The present invention comprises a variety of bioerodible polymeric compositons which have been formed using amino acid monomers which have been polymerized by hydrolytically labile bonds between the respective side-chains of the amino acids in the monomer rather than by linkage of the amino and carboxyl groups of the monomer unit itself. It is presumed therefore that the reader has a thorough and complete understanding and knowledge of amino acid structure and properties, methods known in the art for the synthesis of peptides of various length and molecular weights, and the many biochemical reactions involving peptides and other biochemically reactive entities. Many reactions and syntheses used in preparing the present invention are thus general methods known in the art and will not be described in extreme detail herein. Instead, the reader is directed to the following texts for complete information: Albert L. Lehninger, *Biochemistry* (2nd edition), Worth Publishers, Inc., New York, N.Y. 1975; West, Todd, Mason and van Bruggen, *Textbook Of Biochemistry* (4th edition), T. V. MacMillan Company, New York, N.Y., 1966; Morrison and Boyde, *Organic Chemistry*, Allyn and Bacon, Inc., Boston, 1959. Specific details regarding reactants, reactions, specific syntheses and polymerizations will be described in detail and identified as appropriate.

The monomer unit used in the present invention comprises two or three amino acids joined together via a peptide bond to form the general structure shown in FIG. 1.

Diagram 1

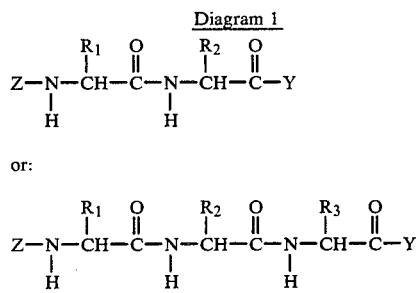

The unique structural properties of the dipeptide or tripeptide arise in part from the side chains, $R_1$, $R_2$ and $R_3$ anchored to the basic peptide configuration formed by the amide bond. The amino acids are one of the approximately 20 naturally occurring L-alpha amino acids whose side chains fall into different structural groups and provide a great diversity of function. These L-alpha amino acids and their side groups are identified in Table I and provide at least the following functional variations: lipophilic or nonpolar groups such as the side chains of alanine, valine, leucine, isoleucine and proline; polar or hydrophilic groups such as the side chains of serine, threonine, aspartic acid, glutamic acid, asparagine, glutamine, lysine, hydroxylysine, arginine, hydroxyproline, and methionine; groups capable of oxidation-reduction such as those of cysteine or cystine; groups having pi-bonded or aromatic character such as those of phenylalanine, tyrosine tryptophan and histidine; and positively or negatively charged side chains such as those of aspartic acid, glutamic acid, lysine, hydroxylysine, arginine and histidine. In addition to these, a number of amino acids found from special sources are also believed useful in forming the monomer unit. These include citrulline, ornithine, lanthionine, hypoglycin A, beta-alanine, gamma amino butyric acid, alpha aminoadipic acid, canavanine, venkolic acid, thiolhistidine, ergothioneine, dihydroxyphenylalanine, and others well recognized and characterized in protein chemistry.

TABLE I

| Amino Acid | R Group |
|---|---|
| Alanine | —$CH_3$ |

TABLE I-continued

| Amino Acid | R Group |
|---|---|
| Valine | —CH(CH₃)₂ |
| Leucine | —CH₂—CH(CH₃)₂ |
| Isoleucine | —CH(CH₃)—CH₂—CH₃ |
| Proline | —CH(CH₂CH₂CH₂)NH (ring) |
| Phenylalanine | —CH₂—C₆H₅ |
| Tryptophan | —CH₂—(indole) |
| Methionine | —CH₂—CH₂—S—CH₃ |
| Glycine | —H |
| Serine | —CH₂—OH |
| Threonine | —CH(OH)—CH₃ |
| Cysteine | —CH₂—SH |
| Asparagine | —CH₂—C(=O)NH₂ |
| Glutamine | —CH₂—CH₂—C(=O)NH₂ |
| Aspartic acid | —CH₂—C(=O)O⁻ |
| Glutamic acid | —CH₂—CH₂—C(=O)O⁻ |
| Lysine | —CH₂—CH₂—CH₂—CH₂—$NH_3^+$ |
| Arginine | —CH₂—CH₂—CH₂—NH—C(=$NH_2^+$)—NH₂ |
| Histidine | —CH₂—C=CH / +HN—C(H)=N—NH (imidazole) |

The monomer unit is preferably used with a variety of protection groups Z and Y which are bonded to the amino and carboxyl terminal, respectively, to form the monomer units seen in FIG. 1. In addition, Z can be hydrogen and Y can be hydroxyl.

The protecting groups Z and Y are selected freely from a large variety of biocompatible, nontoxic molecules such as fatty acids, benzoic acid and acetic acid. Methods and reactions for the joining of such protective groups at the Z and Y positions of the dipeptide monomer unit are given in the following publications: Hofmann and Katsoyannis, *The Proteins* (2nd edition) Acadmeic Press, New York, 1963; Greenstein and Winitz, *Chemistry Of The Amino Acids*, John Wiley and Sons, New York, 1961; Hofmann and Yajima, in *Polyamino Acids, Polypeptides, And Proteins* (M. Spahmann editor), University Wisconsin Press, Madison, 1962.

In the alternative, the protecting groups Z and Y may in fact be pharmacologically active ligands or other biologically active substances which can then be linked to the dipeptide monomer at the Z and Y positions. Such pharmacologically active ligands would include the entire range of therapeutic agents such as drugs, antibiotics, vitamins, and other reactants which would then be released into the body by bioerosion of the polymerized composition. Regardless of whether pharmacologically active ligands or other kinds of organic compositions are used as the protecting groups Z and Y, the variety and choices of L-alpha amino acids comprising the monomer units (as well as the protecting groups) provide for an overall variation of chemical and mechanical properties of the polymerized composition which is vast and can be modified to suit a huge range of intended applications.

The monomer unit containing the groups Z and Y is then polymerized by reactions which occur at not less than one of the respective side groups, $R_1$, $R_2$ and $R_3$. These linkages are hydrolytically labile bonds other than the amide bond, the exact nature of which will vary with the chemical formulation and structure of the respective side chain $R_1$, $R_2$ and $R_3$. In its simplest form, the dipeptide is formed of two identical amino acids in which the side chain R is identical in each molecule as shown in Diagram 2(A) and 2(B) below.

Diagram 2

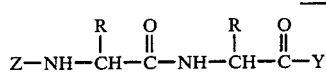

(A)

Diagram 2

-continued (B)

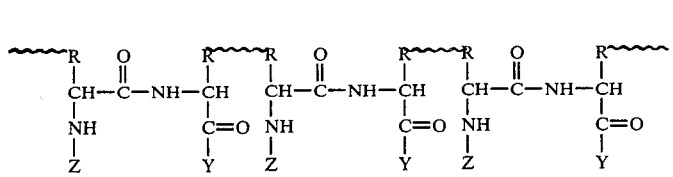

As noted, Diagram 2(A) is a schematic representation of a monomer unit based on L-alpha amino acids. It will be noted that the side chains R of the dipeptide monomer unit are not part of the amide bond backbone. Diagram 2(B) is a schematic representation of the polymerization product of many monomer units using "non-peptide" bonds between the respective side chains R of each monomer unit. The letters Z and Y represent amino and carboxyl protecting groups respectively. The ~~~~ notation symbolizes a hydrolytically unstable bond which is biodegradable. Through this series of polymerization-reactions between the side groups R of each individual monomer unit, a polymeric backbone is formed which provides both the mechanical and chemical characteristics of the polymer composition as a whole.

The feasibility of this approach and methodology is demonstrated by the preparation of poly (N-carbobenzoxytyrosyltyrosine ethylester iminocarbonate) in accordance with this invention. The monomer from which this polymer is produced is made using conventional peptide chemistry synthetic procedures [Schroder and Lubke, *The Peptides, Methods Of Peptide Synthesis*, Vol. 1, Academic Press, New York, 1965; Bardoll et al., *Am. Chem. Soc. J.* 66:951 (1944)]. The synthetic pathways for the preparation of the fully protected dipeptide N-carbobenzoxy-tyrosyltyrosine ethylester (hereinafter "CbzTyrTyrOEt") and the preparation of poly (CbzTyrTyrOEtiminocarbonate) are schematically represented in Diagram 3(A) and 3(B).

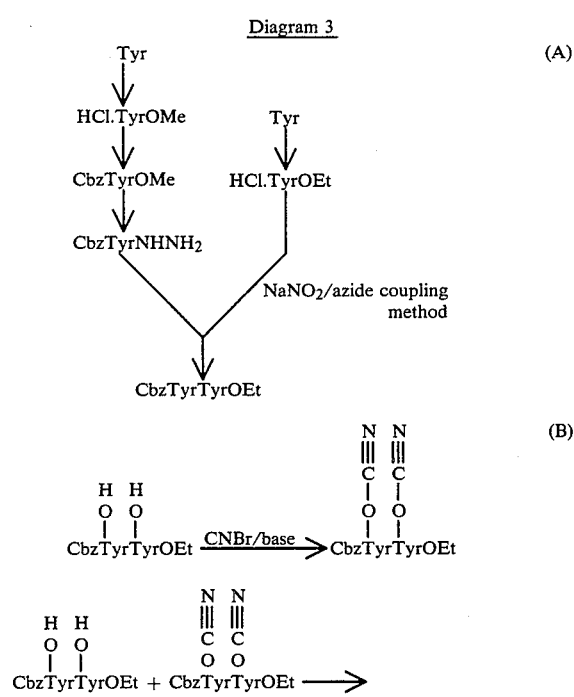

-continued
Diagram 3

$$\begin{array}{ccc} \text{NH} & \text{NH} & \text{NH} \\ \| & \| & \| \\ \text{C}-\text{O} & \text{O}-\text{C}-\text{O} & \text{O}-\text{C} \\ | & | & | \\ \text{CbzTyrTryOEt} & & \text{CbzTyrTyrOEt} \end{array}$$

In the first reaction step illustrated in Diagram 3(A), tyrosine is converted to tyrosyl methyl ester or ethyl ester hydrochloride respectively. After formation of the dipeptide as outlined in Diagram 3(A), the dipeptide is subsequently cyanylated to yield the corresponding dicyanate derivatives. When equimolar quantities of dipeptide monomer and dipeptide-dicyanate monomer are mixed as shown in Diagram 3(B), rapid polymerization occurs in the presence of a basic catalyst such as sodium hydroxide, triethylamine, or potassium tert-butoxide to yield the corresponding polyiminocarbonate having the general formula:

$$(C_{29} H_{29} N_3 O_7)_n$$

Testing of this polymer composition, poly (CbzTyr-TyrOET-imino carbonate) shows that this polymer erodes completely within 93 days when exposed to 0.1 M phosphate buffer (pH 7.4) at 37° C. The chemical, mechanical, and toxicological properties of this polymer indicate that it is suitable for implantation and use with humans to yield nontoxic bioerodible degradation products. In this example it will be noted that the carbobenzoxy group represents the protecting group Z at the amino terminal end of the monomer unit. During the initial synthesis the carbobenzoxy group was chosen for reasons of convenience and in other embodiments the carbobenzoxy group may subsequently be replaced by a large variety of pharmacologically active ligands. Using known methods of chemically linking drugs to the amino terminal of the monomer unit, drug-monomer conjugates can be obtained which, upon polymerization create a bioerodible polymeric composition which delivers drugs, antibiotics, hormones such as insulin, and other active agents for therapeutic purposes slowly within the body with predictable controlled release mechanisms. All that is required is that the drug molecule contain a moiety such as carboxyl which is reactive with the amino moiety or which can be modified to create a moiety that is reactive with the amino moiety. Similarly, drug-monomer conjugates can be formed at the carboxyl terminal of the monomer.

The preparation of the polyiminocarbonate polymer as described above is only one example of the many different kinds of polymers all derived from monomer units whose side chains are linked by hydrolytically labile bonds. In these other examples, the amino acids forming the monomer unit are different thereby giving rise to different and independent side groups $R_1$, $R_2$ and $R_3$ which are joined to one another between monomer units. Other useful examples in a non-exhaustive listing are given in Table II below.

TABLE II position. It is not required however that all three side chains be actively involved in the polymerization process. In most instances, only two of the three side chains $R_1$, $R_2$ and $R_3$ will Diagram 5

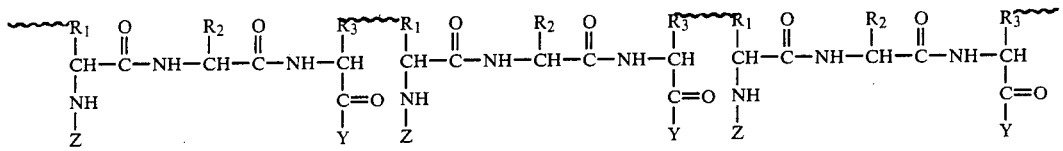

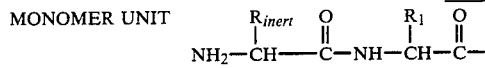

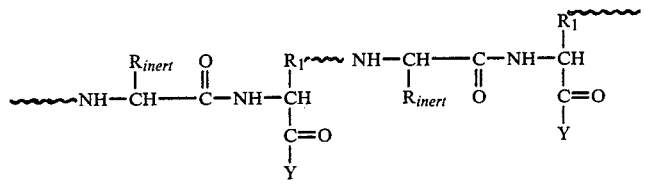

(A)

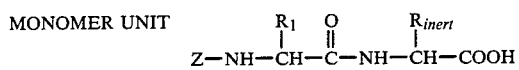

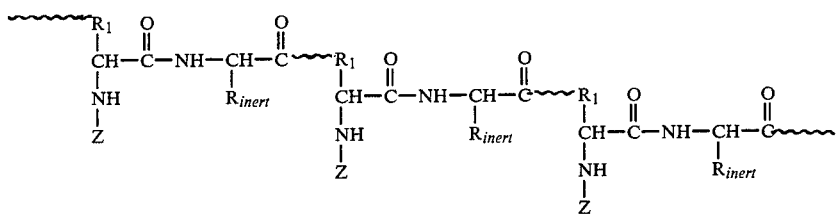

(B)

| cpd | bond type |
|---|---|
| Z—Tyr—Tyr—Y | iminocarbonates |
| Z—Glu—Glu—Y | anhydrides |
| Z—Glu—Phe | anhydrides |
| Z—Tyr—Glu—Y | phenyl esters |
| Z—Tyr—Phe | phenyl esters |
| Z—Ser—Phe | aliphatic esters |
| Z—His—Phe | imidazolides |
| Z—His—Glu—Y | imidazolides |
| Z—Cys—Cys—Y | sulfides |

In these other examples it will be noted that blocking groups Z and Y are presumed to be known in the art and that the choice of specific functional groups at either the amino or carboxyl terminal ends is merely a matter of convenience for the user.

Another preferred embodiment comprising the present invention is the formation of a monomer unit using three amino acids joined together by a series of amide bonds. A basic structural formulation for such monomer units is given by the chemical formulation of Diagram 4

Diagram 4

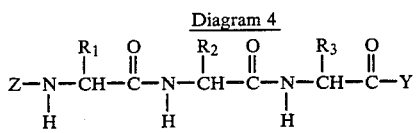

It will be recognized that this monomer structure has three side groups per unit, $R_1$, $R_2$ and $R_3$ for reaction via hydrolytically labile bonds to form the polymeric combe involved in reactions to form the polymer. This is schematically represented in Diagram 5 wherein the tripeptide monomer units form a polymer by hydrolytically labile bonds between the $R_1$ and $R_3$ side groups between individual monomer units. As before, the Z and Y compositions represent amino and carboxyl protecting groups, respectively, and the ∼∼∼ symbol indicates a hydrolytically unstable bond.

The minimum number of side chains in the monomer composition which must be involved in the polymerization process via hydrolytically labile bonds, however, is only one. In this instance, either the Z and/or Y protective groups are omitted from the monomer unit leaving a functional amino and/or carboxyl group intact for reaction via a non-amide bond, i.e., a hydrolytically labile bond, with the reactive side group R of another monomer unit. This kind of monomer unit and polymerization reaction is schematically illustrated in FIG. 6(A) and 6(B).

It is apparent to those skilled in the art that other side groups R than those previously listed and identified are available for reaction with the amino terminal end or carboxyl terminal end of monomer units under similar conditions using known methods of reaction. Although such polymeric compositions are more structurally and chemically complex compared to those previously described, all such polymeric compositions wherein at least one of the side groups in the monomer unit are joined via hydrolytic labile bonds to another monomer unit are within the scope of the present invention.

Some of the unique and unexpected advantages of polymeric compositions synthesized as described herein include the following: these compositions are non-toxic in their polymer state and are biodegradable with predictable controlled release times into non-toxic degradation products. A variety of pharmacologically or biologically active ligands can be incorporated into the monomeric units regardless of exact compositon and structure for subsequent use of the polymer as a controlled drug delivery system. The drug can be chemically incorporated into the polymer chains as pendent side chains. For example, the amino blocking group Z can be methotrexate (a drug used in cancer chemotherapy), which can be chemically incorporated into any polymer having a free amino group by the carbodiimide coupling reaction. Alternatively, a polymeric matrix of above monomers can be prepared and any drug can be physically embedded or dispersed within the polymeric matrix. The chemical, mechanical, and biodegradability properties are adjustable and will vary with the number and kind of amino acids comprising the monomer unit and the nature of the hydrolytic labile bond.

The immediate applications of this new biomaterial go well beyond the ability to be used for drug delivery in controlled release systems. Other in vivo applications include use of such bioerodible compositions as grafts, bone plates, sutures, implantable sensors and other therapeutic aids and articles which decompose harmlessly within a known period of time. In vitro applications include the use of such polymeric compositions as carries for the distribution of pesticides and fumigants in agricultural settings and as carriers of other biochemically reactive agents such as detergents, emulsifying agents and the like in pollution controlled devices and containment systems.

The following examples illustrate the present invention and are not intended to limit the same.

EXAMPLE I

This example illustrates the preparation of tyrosine alkyl esters, in particular methyl tyrosinate and ethyl tyrosinate, as the procedures illustrate in Diagram 3(A) and 3(B).

In order to prepare a 0.1 M composition of methyl tyrosinate or ethyl tyrosinate, place 60 ml methanol or 75 ml ethanol, respectively, in a ground glass stoppered Erlenmeyer flask. Cool to below −50° C. by means of a dry ice - isopropanol cooling mixture. Add 8.5 ml thionyl chloride in a slow stream. Keeping the temperature at about −50° C., add 18.1 g finely powdered Tyr with vigorous stirring. Seal the suspension and allow to stand for 18–24 hrs. with stirring at 20° C.

A yellow clear solution is obtained. The ester may precipitate. This precipitate can be dissolved by gently warming the mixture.

Pour the reaction mixture into a 500 ml Erlenmeyer flask. Fill to 500 ml with ethylacetate. A yellow oil forms which rapidly crystallizes. Put the reaction flask into −20° C. for about 1 hour for the crystallization to be complete. Collect the crystals on a Buchner funnel and wash with ethyl ether until all thionyl chloride has been removed. Dry the crude product in vacuum. The crude product is nearly colorless.

Yield for crude product is usually in the range of 90%. HCl . TyrOMe: observed mp. 191°–192° C. lit. mp. 193°–194° C. HCl . TyrOEt: observed mp. 172° C. lit. mp. 166° C.

EXAMPLE II

This example illustrates the preparation of N-Carbobenzoxy tyrosine methyl ester (N-Cbz Tyr OMe). Weigh out 23.2 g of crude HCl . TyrOMe (0.1 M, MW=231.68)
8.3 g of $K_2CO_3$ (0.06 M, MW=138.21)
10.5 g of $K_2CO_3$ (0.076 M, MW=138.21)
17.7 g (15.0 ml) of technical grade benzylchloroformate (0.104 M, MW=170)

Set up the reaction vessel (1 liter 3-necked Round Bottom flask), equipped with powerful overhead stirrer and thermometer.

Prepare the following solutions:
Solution A: 8.3 of $K_2CO_3$ dissolved in 20 ml $H_2O$.
Solution B: 10.5 g of $K_2CO_3$ dissolved in 40 ml $H_2O$.
Solution C: 15 ml of benzylchloroformate diluted to 40 ml with ethylacetate.

Place the HCl . TyrOMe into the reaction vessel and dissolve it in 50 ml water. Add 300 ml ethylacetate and cool the two-phase reaction mixture to 0° C. by means of a dry ice-isopropanol cooling bath which is maintained at −10° C. With vigorous stirring, add solution A dropwise to the reaction mixture. A precipitate of free methyl tyrosinate is obtained.

With stirring, add aliquots of solutions B and C in 10 portions of 4 ml each at intervals of 2 min. During this time keep the temperature at about −5° C. The precipitate of methyl tyrosinate should dissolve, resulting in two clear, easily separable phases. Continue stirring 45 min. while the reaction mixture slowly warms up to room temperature.

Terminate the reaction by adding 1 ml of pyridine, and continue stirring for 5 min. more.

Transfer the reaction mixture into a 500 ml separatory funnel. Remove the aqueous phase and wash the organic phase twice with 100 ml of 1:1 mixture of 0.1 M HCl and saturated NaCl solution, followed by one washing with 100 ml saturated NaCl solution. Thereafter, dry the organic phase over anhydrous $Na_2SO_4$. The organic phase should be clear and virtually colorless at this stage.

Filter off any $Na_2SO_4$ and evaporate the clear filtrate at low tempertaure (=40° C.) in a rotary evaporator. A clear oil is obtained, which crystallizes overnight at 4° C. Wash the crystalline solid with hexane, filter on a Buchner funnel, and dry in high vacuum.

Yield is approximately 90%. CbzTyrOMe: observed mp. 95.5°–97.5° C. lit.-mp. 95° C.

EXAMPLE III

This example illustrates the preparation of N-Carbobenzoxy L-tyrosine hydrazide (CbzTyrNHNH$_2$).

32.9 g CbzTyrOMe (0.1 M) are dissolved in 100 ml MeOH. 10 ml hydrazine hydrate (0.2 M) are added. After a few hours a crystalline precipitate of CbzTyrNHNH$_2$ forms. Allow the reaction to proceed at 25° C. overnight. Wash the precipitated product with 250 ml methanol, collect it on a Buchner funnel, and dry it at 25° C. in high vacuum.

Yield is approximately 95%. observed mp 218° C. lit. mp 218° C.

EXAMPLE IV

This example illustrates the preparation of N-Carbobenzoxy-L-tyrosyl-L-tyrosine ethyl ester (CbzTyrTyrOEt).

Prepare a dry ice/isopropanol cooling bath and get crushed ice.

Precool to 0° C. the following solutions:
300 ml sat. NaCl
300 ml sat. $KHCO_3$

Precool to −20° C. 400 ml of analytical ethylacetate. Place a 1 liter separatory funnel and a stoppered 500 ml Erlenmeyer flask into a freezer to precool the glassware to −20° C.
Weigh out
11.3 g $CbzTyrNHNH_2$ (34 mM)
2.35 g $NaNO_2$ (34 mM)
6.05 g free ethyl tyrosinate (TyrOEt) (28.9 mM, representing 85 mol % of the amount of the hydrazides used).

Then place the free TyrOEt into a dry, clean 500 ml Erlenmeyer flask; stopper and keep at −20° C. in the freezer.

Dissolve the $NaNO_2$ in 7 ml $H_2O$ in a test tube and cool to 0° C. on ice.

Suspend the $CbzTyrNHNH_2$ in 170 ml $H_2O$; add 27 ml of 4 N HCl and dissolve by slowly adding 50–60 ml glacial acetic acid. Stir well until all the $CbzTyrNHNH_2$ has gone into solution.

Cool the clear hydrazide solution to −15° C. Transfer the solution into the precooled separatory funnel. With slight agitation, add the cold $NaNO_2$ solution all at once.

Allow to react for 45 sec. A dense precipitation of azide should form.

Add 300 ml cold EtAc. Shake vigorously until all the azides are dissolved.

Remove the aqueous phase, and keeping the temperature below 0° C., extract the organic phase repeatedly with saturated sodium bicarbonate solution, until all acid has been removed.

Transfer the organic phase into the precooled 500 ml Erlenmeyer flask. Dry over anhydrous Magnesium sulfate while keeping the temperature of the solution below 0° C.

Decant the dried solution into the cold reaction vessel containing the free TyrOEt. Wash the remaining magnesium sulfate with 75 ml fresh, cold ethylacetate and add the washings to the main reaction vessel.

All free TyrOEt dissolves within 1 hr, resulting in a clear, slightly yellowish solution. Seal the reaction vessel and keep at 0° C. for 24 hrs.

Thereafter, remove excess free TyrOEt by washing the organic phase twice with 100 ml of 0.1 N HCl.

Dry the organic phase over anhydrous magnesium sulfate. Treat with charcoal and filter.

Dilute the clear filtrate to twice its initial volume with hexane. Immediately, a milky white emulsion forms and an oil starts to separate. Keep at 4° C. until complete crystallization occurs.

Separate the precipitate by filtration, wash with a 1:2 mixture of ethylacetate and dry in vacuum.

Obtained: 13.11g slightly tinted solids, corresponding to a yield of approximately 90% (based on free TyrOEt). Mp=140°–150° C.

Purification

Recrystallize from 30%(v/v) aqueous EtOH using 80 ml solvent per gram of crude CbzTyrTyrOEt. First heat the required amount of aqueous EtOH to about 60° C. Then add the crude product. All solids dissolve upon short boiling. (Add charcoal if the solution is not colorless). Filter, then cool the clear filtrate rapidly to about 40° C. A milky white emulsion forms, which is kept at 37° C. overnight.

White crystalline solids form, which are collected on a Buchner funnel, washed with 30%(v/v) aqueous EtOH, and dried at 40°–60° C. in high vacuum.

Obtained: approximately 10 g pure CbzTyrTyrOEt mp=161°–163° C. overall yield (based on free TyrOEt) is approximately 68%

EXAMPLE V

This example illustrates the preparation of CbzTyrTyrOEt-dicyanate
Solution A:
5.06 g CbzTyrTyrOEt and 2.1 g triethylamine are dissolved in 40 ml acetone.

2.65 g cyanogen bromide are placed in a 100 ml three-necked flask and dissolved in 40 ml acetone. The flask is equipped with a thermometer, an over-head stirrer and a dropping funnel. Solution A is placed into the dropping funnel. The system is protected from moisture by $CaCl_2$-drying tubes.

The system is cooled to −10° C. Then solution A is slowly added into the cyanogen bromide solution with vigorous stirring, maintaining the temperature of the reaction mixture at −10° C. After 30 minutes, the reaction mixture is allowed to warm slowly to 25° C. White precipitates form. The suspension is poured into 400 ml ice-cold water, resulting in the complete precipitation of crude CbzTyrTyrOEt-dicyanate.

The product is collected by filtration, washed with ice-cold water, followed by ice cold isopropanol, and rapidly dried in high vacuum.

Obtained: 5.2 g crude product 94% of theory.

After recrystallization from isopropanol, the product forms long, fine crystals, melting at 164°–165° C.

CbzTyrTyrOEt-dicyanate: $C_{30} H_{28} N_4 O_7$

IR-spectroscopy: bands at 2282 $cm^{-1}$ (vs, cyanate stretch), 2244 $cm^{-1}$ (vs, cyanate stretch), 1198 $cm^{-1}$ (s, C-O stretch of cyanate), 1169 $cm^{-1}$ (vs, C-O stretch of cyanate).

EXAMPLE VI

This example illustrates the preparation of poly (CbzTyrTyrOEt-iminocarbonate)

253 mg triple recrystallized CbzTyrTyrOEt and 279 mg triple recrystallized CbzTyrTyrOEt-dicyanate are dissolved in 1 ml N-methylpyrrolidone. 2.5 microliter of a 10 M aqueous solution of sodium hydroxide is added to initiate the polymerization.

After 8 h at 25° C., a clear viscous solution is obtained.

The polymer poly (CbzTyrTyrOEt-iminocarbonate) is obtained in pure form by precipitation from acetone.

T melt=200°–210° C., MW (number averge)=14.500 soluble in warm dioxane DMF, DMSO, but insoluble in ether, benzene, tetrahydrofuran, chlorinated hydrocarbons and water.

IR-spectroscopy shows the typical imino carbonate band at 1680 $cm^{-1}$ in addition to bands at 3340 $cm^{-1}$ (m, N-H stretch of imine), 1329 cm$^{-1}$ (vs, br, C-O stretch of imino carbonate), 1205 cm$^{-1}$ (s, br, C-O stretch of imino carbonate), 1170 cm (s, br, C-O stretch of imino carbonate), 1058 cm$^{-1}$ (s, br, C-O stretch of imino carbonate)

EXAMPLE VII

This example describes the preparation of poly (N-Carbobenzoxy-L-glutamylphenylalanine anhydride), abbreviated as poly (CbzGluphe). Poly (CbzGluPhe) serves as example for a polymer in which only one amino-acid side chain participates in the polymerization reaction.

Polymerization Reaction 1 g of CbzGluPhe (2.33 m mole of monomer=4.66 me ♀ of acid) and 0.65 ml neat, freshly distilled and dry triethylamine (4.66 m mole) are dissolved under exclusion of moisture in 10 ml dry methylene chloride. Immediately a clear solution is obtained.

This solution is treated with 0.49 ml diphenylchlorophosphate (2.4 m mole, obtained from Aldrich Chemical Company, P. O. Box 355, Milwaukee, WI 53201, USA, product number D20,655-5) in a dry, closed flask. A clear colorless solution is obtained which is stored for 12 h at 4° C.

Infrared spectroscopy of this solution shows the complete disappearance of the peak of 1720 cm$^{-1}$, typical for the carboxylic acid function of the monomer. Instead a strong doublet peak of 1820 cm$^{-1}$ and 1760 cm$^{-1}$ appeared, typical of the anhydride function.

The polymer was purified by preparative gel permeation chromatography using 8% divinyl-benzene-cross-linked polystyrene beads (obtained from Polysciences, 400 valley Road, Warrington, PA 18976) as stationary phase and methylene chloride as solvent. The purified product was a colorless, tough material with a molecular weight (number average) of 17800, as determined by vapor pressure osmometry.

We claim:

1. A bioerodible polymer formed by polymerizing a dipeptide formed exclusively of L-alpha amino acids of the formula:

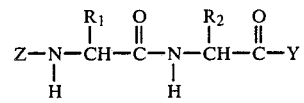

or by polymerizing a tripeptide formed exclusively of L-alpha amino acids of the formula:

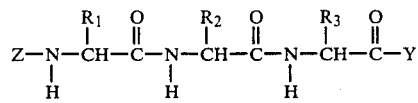

wherein at least one of Z or Y is an amine or carboxyl protecting group and wherein polymerization is effected through at least one of $R_1$, $R_2$ or $R_3$ without the formation of additional peptide bonds through the terminal, amine and carboxyl groups of said dipeptide or tripeptide.

2. The bioerodible polymer as recited in claim 1 wherein at least Y or Z is a pharmacologically active ligand.

3. The bioerodible polymer as recited in claim 2 wherein Y is a pharmacologically active ligand.

4. The bioerodible polymer as recited in claim 2 wherein Z is a pharmacologically active ligand.

5. The biodegradable polymer as recited in claim 1 wherein said hydrolytic labile bond is selected from the group consisting of imidocarbonate bonds, anhydride bonds, aromatic ester bonds, aliphatic ester bonds, sulfide bonds and imidazolide bonds.

6. The bioerodible polymer as recited in claim 1 wherein Z and Y comprise protecting groups of the amino terminal end and the carboxyl terminal end of the monomer unit.

7. The bioerodible polymer of claim 2 wherein the pharmacologically active ligand is a drug.

8. The bioerodible polymer of claim 7 wherein the drug is methotrexate.

9. The bioerodible polymer of claim 1 wherein at least one L-alpha amino acid is tyrosine.

10. The bioerodible polymer of claim 1 wherein at least one L-alpha amino acid is glutamine.

11. The bioerodible polymer of claim 1 wherein at least one L-alpha amino acid is phenylalanine.

12. The bioerodible polymer of claim 1 wherein at least one L-alpha amino acid is histidine.

13. The bioerodible polymer of claim 1 wherein at least one L-alpha amino acid is cysteine.

14. The composition of claim 1 which includes a pharmacologically active agent physically admixed within said polymer.

* * * * *